US006355361B1

(12) United States Patent
Ueno et al.

(10) Patent No.: US 6,355,361 B1
(45) Date of Patent: *Mar. 12, 2002

(54) FE GROUP-BASED AMORPHOUS ALLOY RIBBON AND MAGNETIC MARKER

(75) Inventors: Shuji Ueno; Kenji Amiya; Toshiyuki Hirano; Isamu Ogasawara, all of Kyoto (JP)

(73) Assignee: Unitika Ltd., Hyogo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,395

(22) Filed: Sep. 30, 1997

(30) Foreign Application Priority Data

| | | |
|---|---|---|
| Sep. 30, 1996 | (JP) | 8-258170 |
| Sep. 30, 1996 | (JP) | 8-258171 |
| Oct. 11, 1996 | (JP) | 8-269610 |
| Nov. 12, 1996 | (JP) | 8-300088 |
| Jan. 30, 1997 | (JP) | 9-016327 |
| Jan. 30, 1997 | (JP) | 9-016328 |
| Jun. 25, 1997 | (JP) | 9-168377 |

(51) Int. Cl.[7] .......... B32B 15/02; B32B 15/08; H01F 1/00; G01N 27/72

(52) U.S. Cl. .......... 428/611; 428/592; 428/681; 428/332; 428/692; 340/572.6; 324/200; 324/219

(58) Field of Search .......... 428/592, 681, 428/213, 215, 220, 332, 692, 699, 900, 688, 457, 611, 607; 148/300, 304, 305, 306, 307, 320; 340/551, 572.1, 572.6; 324/200, 219; 420/8

(56) References Cited

U.S. PATENT DOCUMENTS

| | | | | | |
|---|---|---|---|---|---|
| 3,820,090 | A | * | 6/1974 | Wiegand | 340/174 ZB |
| 4,660,025 | A | * | 4/1987 | Humphrey | 340/572 |
| 4,686,516 | A | * | 8/1987 | Humphrey | 340/572 |
| 4,797,658 | A | * | 1/1989 | Humphrey | 340/551 |
| 4,865,664 | A | * | 9/1989 | Sato et al. | 148/403 |
| 4,960,651 | A | * | 10/1990 | Pettigrew et al. | 428/607 |
| 5,181,020 | A | | 1/1993 | Furukawa et al. | 340/551 |
| 5,469,140 | A | * | 11/1995 | Liu et al. | 340/551 |
| 5,605,768 | A | * | 2/1997 | Furukawa et al. | 428/611 |
| 5,650,236 | A | * | 7/1997 | Hirano et al. | 428/611 |
| 5,757,272 | A | * | 5/1998 | Herzer et al. | 340/572 |

FOREIGN PATENT DOCUMENTS

| | | | |
|---|---|---|---|
| EP | 0216584 A2 | | 4/1987 |
| EP | 0729122 A1 | | 8/1996 |
| EP | 782013 A2 | * | 7/1997 |

OTHER PUBLICATIONS

Miura et al., Dai 13 Kai Nohon Oyo Jiki Gakkai Gakujutsu Koen Yoshishu (Resume for the 13th Lecture of the Magnetics Society of Japan, p. 24aE–7 (1989, No Month).*
Mohri et al., "Sensitive Magnetic Sensors . . . " IEEE Trans. on Magnetics vol. MAG 17, No. 6, Nov. 1981, pp. 3370–2, Nov. 1981.*

(List continued on next page.)

*Primary Examiner*—Deborah Jones
*Assistant Examiner*—Michael LaVilla
(74) *Attorney, Agent, or Firm*—Sughrue Mion, PLLC

(57) ABSTRACT

An Fe group-based amorphous alloy ribbon having a cross section having a width of from 100 to 900 $\mu$m and a thickness of from 8 to 50 $\mu$m and a magnetic hysteresis loop which exhibits a large Barkhausen discontinuity. The amorphous alloy ribbon is suitable for preparing magnetic markers for use in an anti-theft system and an article surveillance system, and as a pulse generator. A magnetic marker formed from the amorphous alloy ribbon is also disclosed.

14 Claims, 2 Drawing Sheets

OTHER PUBLICATIONS

A. Zhukov et al., "Axial and transverse magnetization processes of glass–coated amorphous microwires," *Journal of Magnetism and Magnetic materials*, May 1996, vol. 157/158, pp. 143–144.

V. Madurga et al., "On the second–order elastic effects in amorphous ribbons under torsion," *Journal of Physics D. Applied Physics*, Aug. 1984, vol. 17, No. 8, pp. L127–132.

A. Hernando et al., The Matteucci and Inverse Wiedemann Effect in Fe40Ni40P20, *Digests of the Intermag Conference*, May 1978, pp. 40–45.

M. Rodriguez et al., Magnetic behavior of amorphous ribbons with induced helical anisotrophy, *Journal of Magnetism and Magnetic Materials*, May 1996, vol. 157–158, pp. 177–178.

* cited by examiner-

FE GROUP-BASED AMORPHOUS ALLOY RIBBON AND MAGNETIC MARKER

FIELD OF THE INVENTION

The present invention relates to an Fe group-based amorphous alloy ribbon which has magnetic characteristics exhibiting a large Barkhausen discontinuity in a magnetic hysteresis loop and which has excellent pulse voltage generating properties. More particularly, the present invention relates to a magnetic marker comprising the above ribbon for use in an anti-theft system or in an article surveillance system.

BACKGROUND OF THE INVENTION

It is well known that amorphous alloy materials having various forms such as a ribbon form, a filament form, a powder form, etc., can be obtained by quenching a molten alloy. In particular, the Fe- and Co-based amorphous alloy filaments disclosed in JP-A-1-25941 (corresponding to U.S. Pat. No. 4,735,864) and JP-A-1-25932 (corresponding to U.S. Pat. No. 4,781,771) are known magnetic materials having a distinctive magnetic characteristic called a large Barkhausen discontinuity. These materials undergo a sudden magnetic flux reversal when the strength of an applied magnetic field reaches a critical value in a magnetic hysteresis loop. (The term "JP-A" as used herein means an "unexamined published Japanese patent application".) These amorphous alloy filaments have been widely used in various magnetic markers and in magnetic sensors as pulse generator which induce a sharp voltage pulse in a detection coil independent of the alternating frequency of an applied magnetizing magnetic field.

On the other hand, it is known that a quench-solidified Fe group-based amorphous alloy ribbon does not exhibit a large Barkhausen discontinuity, while a quench-solidified amorphous filaments exhibit a large Barkhausen discontinuity. However, it is also known that an amorphous alloy ribbon subjected to a specific heat treatment is capable of exhibiting a large Barkhausen discontinuity. JP-B-3-27958 (corresponding to U.S. Pat. Nos. 4,660,025 and 4,686,516) discloses that, by keeping an Fe-based amorphous alloy ribbon in a flattened state after heat treating at 380° C. with twist of 4 turns per 10 cm length of the ribbon, the amorphous alloy ribbon exhibits magnetic characteristics having a large Barkhausen discontinuity. (The term "JP-B" as used herein means an "examined published Japanese patent application".)

Also, EP-A-762354 discloses a Co-based amorphous alloy ribbon heat-treated by passing an electric current therethrough in a magnetic field which has magnetic characteristics exhibiting a large Barkhausen discontinuity, and also describes that magnetic markers can be formed from such a Co-based amorphous alloy ribbon.

Recently, with the popularity of anti-theft systems and article surveillance systems utilizing magnetic markers, a magnetic marker having an inconspicuous construction for adhering to articles has been desired, and there is a demand for a new small-sized soft magnetic material having a length of 10 cm or shorter, and desirably 7 cm or shorter, which can be formed into a thin-type magnetic marker.

However, in the case of magnetic markers formed from the above-described Fe- and Co-based amorphous alloy filaments, the diameter of the filament is necessarily 90 μm or larger in order to provide sufficient pulse generating characteristics. Thus, the resulting magnetic markers disadvantageously become thick when these filaments are inserted between various film materials or papers.

On the other hand, when the present inventors prepared an Fe-based amorphous alloy ribbon which was twisted 4 turns per 10 cm while being heat treated at 380° C. for 25 minutes using an $Fe_{81}Si_4B_{14}C_1$ (the numerals represent atomic %) amorphous alloy ribbon having a width of 2 mm and a thickness of 25 μm as disclosed in JP-B-3-27958, the following problem was identified.

That is, the present inventors found that amorphous alloy ribbons longer than 10 cm can be obtained which have magnetic characteristics exhibiting a large Barkhausen discontinuity, but a twisting number of 4 or more turns per 10 cm of the length of the ribbon during heat treatment is required. In addition, in a state in which the twisted amorphous alloy ribbon is released and held flat after heat treatment, the minimum magnitude of the applied magnetizing field (critical magnetic field) needed to evoke a large Barkhausen discontinuity is greater than 0.8 Oe. Also, because the critical magnetic field is large, an induced pulse is not generated in a detection coil in a magnetizing field of 0.7 Oe or lower. Thus, only magnetic markers having poor detection characteristics in various anti-theft systems can be realized.

Also, it has been found that an amorphous alloy ribbon having a length of 10 cm or shorter after heat treatment does not have magnetic characteristics exhibiting a large Barkhausen discontinuity. That is, it has been determined that an amorphous alloy ribbon after heat treatment where the twisted amorphous alloy ribbon is untwisted and the ribbon is held flat has poor pulse voltage generation characteristics, and thus cannot be formed into small-sized and thin magnetic markers.

Furthermore, because the twisting number is as high as 4 turns or more per 10 cm length of the amorphous alloy ribbon, there are problems in that the ribbon frequently tears during heat treatment, and kinking or distortion of the ribbon due to the severe twisting occurs when winding the ribbon on a bobbin after heat treatment or when unwinding the ribbon from a bobbin. Also, it was determined that magnetic markers comprising an Fe-based amorphous alloy ribbon which, after heat treatment is flattened with a film of an organic material, are problematic in that, due to the high toughness of the Fe-based amorphous alloy ribbon, the magnetic markers adopt a strongly twisted state. Handling of the magnetic marker thus becomes difficult, and the magnetic markers are liable to release from articles to which they are adhered.

Also, the present inventors heat treated a Co-based amorphous alloy ribbon by passing electric current therethrough in a magnetic field as disclosed in EP-A-762354. The magnetic characteristics thereof were measured. It was determined that an amorphous alloy ribbon having a length of 10 cm can exhibit a large Barkhausen discontinuity, but the minimum value of the magnetizing field (critical magnetic field) needed to evoke a large Barkhausen discontinuity is larger than 0.8 Oe. Also, it was confirmed that, because the critical magnetic field for the amorphous alloy ribbon is large, magnetic markers formed with this amorphous alloy ribbon do not generate an induced pulse in a detection coil in a low magnetizing field of 0.7 Oe or lower. Thus, the detection characteristics in various anti-theft systems are poor, and practical magnetic markers cannot be obtained.

Accordingly, the development of an amorphous alloy material which has magnetic characteristics exhibiting a large Barkhausen discontinuity even in a length of 10 cm or shorter and which has a low critical magnetic field for evoking a large Barkhausen discontinuity has been desired.

Also, the development of a thin-type amorphous alloy material for forming magnetic markers without hardly any twisting has been desired.

SUMMARY OF THE INVENTION

Thus, it is an object of the present invention to provide an amorphous alloy ribbon having a length of 10 cm or shorter which exhibits a large Barkhausen discontinuity in a critical magnetic field of 0.7 Oe or lower.

Also, another object of the present invention is to provide a thin-type small-sized magnetic marker comprising the above-described amorphous alloy ribbon which exhibits a large Barkhausen discontinuity.

As a result of various investigations for attaining the above objectives, the present inventors discovered that an Fe group-based amorphous alloy ribbon having a specific cross-sectional form can have magnetic characteristics exhibiting a large Barkhausen discontinuity in a magnetic hysteresis loop even when the length thereof is 10 cm or shorter. Also, only a low critical magnetic field is needed to evoke a large Barkhausen discontinuity, and the characteristics described above can be achieved even in the case of an amorphous alloy ribbon having less twist. The present invention was achieved based on these findings.

That is, in a first embodiment, the present invention provides an Fe group-based amorphous alloy ribbon having a cross section having a width of from 100 to 900 μm and a thickness of from 8 to 50 μm, and having a magnetic hysteresis loop which exhibits a large Barkhausen discontinuity.

In a second embodiment, the present invention provides an Fe group-based amorphous alloy ribbon having a cross-sectional area of from 0.0025 to 0.03 $mm^2$ and having a magnetic hysteresis loop which exhibits a large Barkhausen discontinuity.

In a third embodiment, the present invention provides an Fe group-based amorphous alloy ribbon of the above-described first or second embodiment having a thickness/width ratio of from 0.015 to 0.4.

In a fourth embodiment, the present invention provides an Fe group-based amorphous alloy ribbon prepared by heat-treating a twisted ribbon having a twisting number, when no stress is applied thereto, of from 0.05 to 3.5 turns per 10 cm length of the ribbon, and wherein said amorphous ribbon when held flat has a magnetic hysteresis loop which exhibits a large Barkhausen discontinuity.

Also, in a fifth embodiment, the present invention provides a magnetic marker comprising the Fe group-based amorphous alloy ribbon of the present invention as described above.

The amorphous alloy ribbon of the present invention exhibits a large Barkhausen discontinuity in a critical magnetic field of 0.7 Oe or lower even when the length of the ribbon is 10 cm or shorter. When the amorphous alloy ribbon is placed in an alternating magnetic field, excellent pulse voltage characteristics are obtained in a detection coil. Also, because the twisting number of the amorphous alloy ribbon is reduced, the ribbon is easily handled. As a result, practically usable magnetic markers which scarcely show twisting can be prepared in which the ribbon is held flat with a film of an organic material, etc.

Furthermore, the amorphous alloy ribbon of the present invention can be widely applied to various magnetic sensors such as a rotation sensor, etc. Also, the inventive amorphous alloy ribbon is an industrial material which can be applied to various sensor elements such as a super thin-type pulse generating element, which elements cannot be realized by conventional amorphous alloy filaments.

DETAILED DESCRIPTION OF THE INVENTION

The present invention is explained below with reference to the accompanying drawings.

The amorphous alloy ribbon of the present invention has an amorphous structure as confirmed by X-ray diffraction analysis, but may also contain a small amount of a crystal phase as long as magnetic characteristics exhibiting a large Barkhausen discontinuity in the magnetic hysteresis loop are obtained when the ribbon is held flat.

In the present invention, the width of the amorphous alloy ribbon is from 100 to 900 μm. By reducing the width of the amorphous alloy ribbon to 900 μm or lower, the amorphous ribbon exhibits a large Barkhausen discontinuity in a magnetizing field of 0.7 Oe or lower (that is, exhibits a large Barkhausen discontinuity in a critical magnetic field of 0.7 Oe or lower) even when the length of the ribbon is 10 cm or shorter. Also, the amorphous alloy ribbon has the advantage that, even when inserted between films of an organic material or between papers to form a magnetic marker, a sharp induced pulse having a high voltage and a high level of higher order harmonic waves is generated by the large Barkhausen discontinuity.

In addition, in order to obtain an amorphous alloy ribbon which exhibits a large Barkhausen discontinuity at a lower critical magnetic field after heat treatment, and to obtain magnetic characteristics having a large Barkhausen discontinuity by using a twisting number of 2 turns or lower per 10 cm during heat treatment, the width of the ribbon is preferably from 150 to 800 μm.

Furthermore, in order to obtain magnetic characteristics having a large Barkhausen discontinuity at a low critical magnetic field and in a smaller-sized amorphous alloy ribbon, the width thereof is preferably from 150 to 700 μm.

In this case, if the width of the amorphous alloy ribbon is broader than 900 μm, the critical value of the magnetic field needed to evoke a large Barkhausen discontinuity tends to increase, and an amorphous alloy ribbon having a length shorter than 10 cm after heat treatment does not exhibit a large Barkhausen discontinuity. This is still the case even when the heat treatment is carried out by varying the twisting number applied per 10 cm length during heat treatment, the heat-treatment temperature and the heat-treatment time.

Also, even if a large Barkhausen discontinuity in the magnetic hysteresis loop is obtained, an amorphous alloy ribbon having a width that is narrower than 100 μm is disadvantageous in that the voltage of the induced pulse is low.

Figure 1:
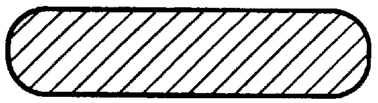
FIG. 1 is a schematic cross-sectional view showing an example of the cross-sectional form of the Fe group-based amorphous alloy ribbon of the present invention.
Figure 2:
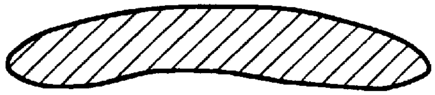
FIG. 2 is a schematic cross-sectional view showing another example of the cross-sectional form of the Fe group-based amorphous alloy ribbon of the present invention.
Figure 3:
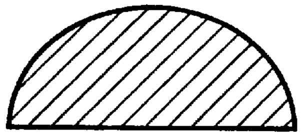
FIG. 3 is a schematic cross-sectional view showing yet another example of the cross-sectional form of the Fe group-based amorphous alloy ribbon of the present invention.

The "width" of the amorphous alloy ribbon of the present invention is the distance between the side portions in a cross section thereof (the longest dimension in the width direction), and the cross sectional form may be selected from various forms such as those shown in FIGS. 1 to 3.

In the present invention, the thickness of the amorphous alloy ribbon is from 8 to 50 μm. Also, from the viewpoint of manufacturability using a melt spinning method, the amorphous alloy ribbon preferably has a thickness of from 15 to 45 μm.

In this case, even if a large Barkhausen discontinuity in the magnetic hysteresis loop is obtained, a thickness of less than 8 μm causes a problem in that the voltage of the induced pulse is low. Also, if the thickness is greater than 50 μm, the material does not become sufficiently amorphous, magnetic characteristics exhibiting a large Barkhausen discontinuity are not obtained even when heat treatment is carried out, and the material tends to become brittle. With respect to this last point, the ribbon tends to tear during the twisting heat treatment and in the step of producing magnetic markers therefrom.

Furthermore, in the present invention, the thickness/width ratio (dimensional ratio) of the amorphous alloy ribbon is preferably from 0.015 to 0.4. Also, from the viewpoint of the magnetic characteristics of the amorphous alloy ribbon and its manufacturability, the thickness/width ratio more preferably is from 0.02 to 0.35. Moreover, in the present invention, in order to obtain magnetic characteristics having a large Barkhausen discontinuity at a low critical magnetic field and in a smaller-sized amorphous alloy ribbon, the thickness/width ratio is most preferably from 0.05 to 0.30.

In the present invention, if the width/thickness ratio of the amorphous alloy ribbon exceeds 0.4, the ribbon becomes brittle due to an insufficient cooling rate during production of the ribbon by a melt spinning method or, in the case of producing a narrow width ribbon from a broad width ribbon by a mechanical cutting method, the production thereof tends to be difficult due to a width that is too narrow. Also, if the thickness/width ratio of the ribbon is less than 0.015, it is difficult to obtain an amorphous alloy ribbon exhibiting a large Barkhausen discontinuity at a low critical magnetic field after heat treatment. Alternatively, an amorphous alloy ribbon having a length that is shorter than 10 cm after heat treatment does not exhibit a large Barkhausen discontinuity in some cases, even when the heat treatment is carried out by varying the twisting number applied per 10 cm length during heat treatment and the heat-treatment conditions such as the heat-treatment temperature, the heat-treatment time, etc.

Furthermore, in the present invention, the cross-sectional area of the amorphous alloy ribbon generally is from 0.0025 $mm^2$ to 0.03 $mm^2$ Also, in view of the magnetic characteristics and manufacturability of the amorphous alloy ribbon, the cross-sectional area of the ribbon is preferably from 0.003 $mm^2$ to 0.0275 $mm^2$, and more preferably from 0.005 $mm^2$ to 0.025 $mm^2$. Furthermore, in order to obtain magnetic characteristics exhibiting a large Barkhausen discontinuity at a low critical magnetic field in a smaller-sized amorphous alloy ribbon of the present invention, the cross-sectional area of the amorphous alloy ribbon is most preferably from 0.005 $mm^2$ to 0.02 $mm^2$.

In the present invention, if the cross-sectional area of the amorphous alloy ribbon is made smaller than 0.0025 $mm^2$, the ribbon is difficult to produce using a melt spinning method or a mechanical cutting method. Furthermore, even if the amorphous alloy ribbon exhibits large Barkhausen characteristics after heat treatment, the pulse voltage thereby generated is too low for practical use.

Also, if the cross-sectional area exceeds 0.03 $mm^2$, an amorphous alloy ribbon having a length of 10 cm or shorter does not exhibit a large Barkhausen discontinuity after heat treatment, even if the heat treatment is applied under varying conditions.

The twisting number of the amorphous alloy ribbon in the present invention is counted once (1 turn) for each 360° rotation. By measuring the twisting number or the twisting angle per 1 meter in length when stress is not applied, the twisting number per 10 cm length of the ribbon is determined. Also, in the amorphous alloy ribbon of the present invention treated by heat treating with twist to thereby impart large Barkhausen characteristics, the width, the thickness, the cross-sectional area, etc., preferably are as described above, and the twisting number is from 0.05 turns to 3.5 turns per 10 cm of the ribbon. Also, in order to obtain large Barkhausen characteristics where the critical magnetic field is further stabilized, the twisting number during heat treatment is more preferably from 0.1 turns to 3 turns per 10 cm of the ribbon.

In this case, if the twisting number per 10 cm of the amorphous alloy ribbon is less than 0.05 turns, the length of the amorphous alloy ribbon necessary for exhibiting a large Barkhausen discontinuity when the ribbon is held flat tends to increase. Also, even though the amorphous alloy ribbon exhibits a large Barkhausen discontinuity, a twisting number of more than 3.5 turns increases the critical value of the magnetic field. Furthermore, the magnetic marker adopts a strongly twisted state due to the high rigidity thereof when the ribbon is untwisted and fixed on a flat surface for preparing a magnetic marker. As a result, a magnetic marker thus prepared is difficult to handle.

In the Fe group-based amorphous alloy ribbon of the present invention, there is no particular limitation with respect to the composition of the alloy that is used as long as the alloy contains at least 65 atomic % of at least one of Fe, Co, and Ni and forms an amorphous single phase. However, an alloy composition containing Ni in a range of 35 atomic % or lower, one or more Fe group-based elements selected from Fe, Co and Ni in a sum total of from 65 atomic % to 90 atomic %, and at least one or more elements selected from B, P, C, Si, Al, Ga, Zr, Nb and Ta for accelerating the formation of an amorphous phase in a sum total of from 10 atomic % to 35 atomic % is preferred in the present invention. Furthermore, in the present invention, the alloy may further contain at least one of W, V, Cr, Cu and Mo in an amount of not more than 10 atomic % for improving the corrosion resistance of the alloy composition, and can be used without causing a particular problem as long as the alloy exhibits a large Barkhausen discontinuity in the magnetic hysteresis loop.

In the present invention, if the total content of the Fe group-based elements is less than 65 atomic %, the magnetic characteristics are deteriorated and the amorphous alloy ribbon tends not to exhibit a large Barkhausen discontinuity in the magnetic hysteresis loop at room temperature. Also, if the total content of the Fe group-based elements exceeds 90 atomic % or if the sum total of the elements for accelerating the formation of an amorphous phase is less than 10 atomic % or exceeds 35 atomic %, respectively, the amorphous phase forming capability is reduced. As a result, it is difficult to form an amorphous single phase, and an amorphous alloy ribbon exhibiting a large Barkhausen discontinuity in the magnetic hysteresis loop becomes difficult to obtain.

Figure 4:
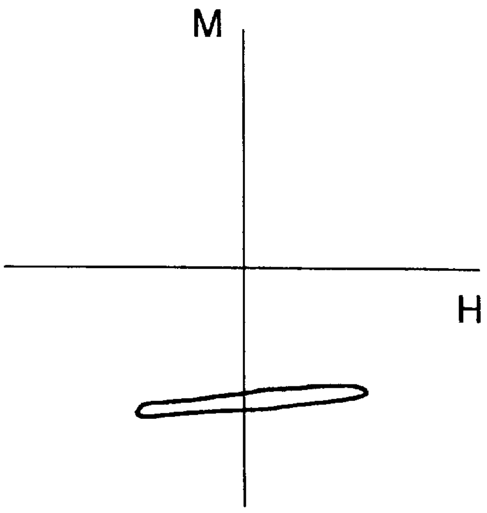
FIG. 4 is a view showing an example of a magnetic hysteresis loop of the Fe group-based amorphous alloy ribbon of the present invention in a magnetizing field that is lower than the critical magnetic field.
Figure 5:
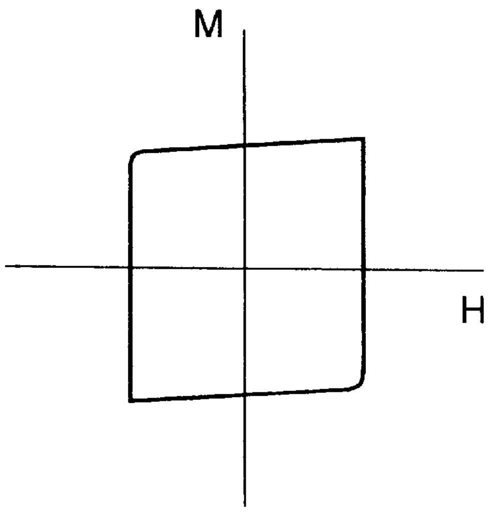
FIG. 5 is a view showing an example of a magnetic hysteresis loop of the Fe group-based amorphous alloy ribbon of the present invention in a magnetizing field that is higher than the critical magnetic field.

The amorphous alloy ribbon of the present invention having a length that is shorter than 10 cm exhibits a large Barkhausen discontinuity which is a sudden magnetic flux reversal when the applied magnetizing field reaches a predetermined strength (hereinafter referred to as the critical magnetic field) in the magnetic hysteresis loop as shown in FIGS. 4 and 5. This is accompanied by a magnetization change in an amount of at least 30% of the saturated magnetization (saturated magnetic flux density) of the material.

Also, when considering application of the amorphous alloy ribbon to magnetic markers, an amorphous alloy ribbon having a length of 7 cm or shorter and which exhibits a large Barkhausen discontinuity is preferred.

Also, in the amorphous alloy ribbon of the present invention, the strength of the critical magnetic field at which the magnetic flux reversal occurs and which is accompanied by a large Barkhausen discontinuity is not more than 0.7 Oe. Furthermore, when used as a magnetic material for a magnetic marker, the strength of the critical magnetic field value is more preferably not more than 0.6 Oe, and most preferably from 0.05 to 0.5 Oe.

In this case, if the strength of the critical magnetic field needed to evoke a large Barkhausen discontinuity exceeds 0.7 Oe, the detection characteristics of a magnetic marker that is formed from the amorphous alloy ribbon tends to deteriorate and the practical properties of the magnetic marker are lowered.

The amorphous alloy ribbon of the present invention generates a sharp induced voltage pulse accompanied by a large Barkhausen discontinuity when subjected to an alternating magnetic field. Also, the higher order harmonic components of the pulse voltage thus generated are obtained at a sufficiently high amplitude for detection. Accordingly, the amorphous alloy ribbon of the present invention can be widely used as a pulse generator for various magnetic markers and magnetic sensors.

Figure 6:
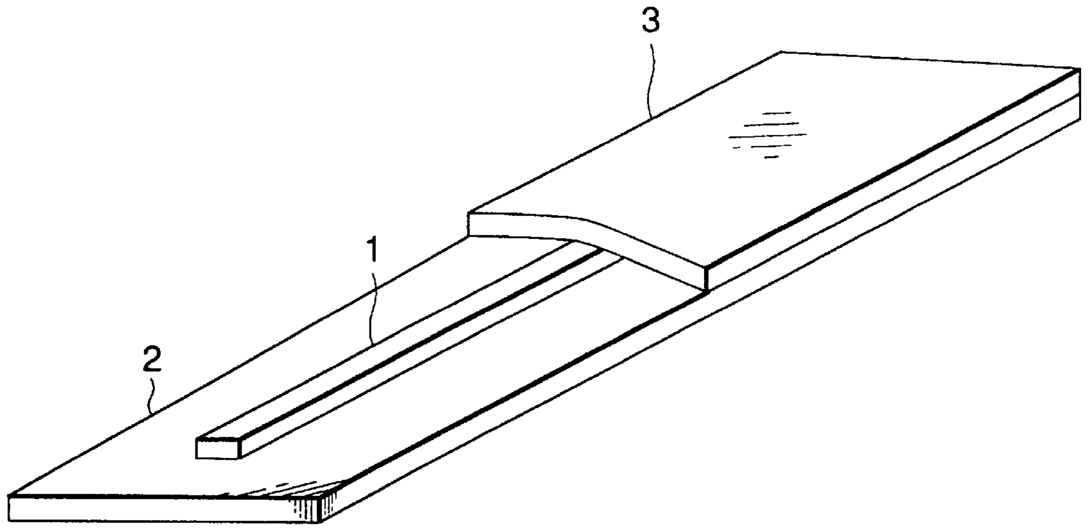
FIG. 6 is a schematic perspective view showing an example of a magnetic marker employing the Fe group-based amorphous alloy ribbon of the present invention.

The magnetic marker of the present invention comprises the above-described amorphous alloy ribbon as a pulse generating element. Also, the magnetic marker can be employed in various forms. For example, FIG. 6 shows a typical magnetic marker structure of the present invention, and the amorphous alloy ribbon of the present invention is preferably maintained in a flat state in which the twist is released. Also, the amorphous alloy ribbon 1 after being cut in a predetermined length may be disposed on a base material film 2 coated with an adhesive, and a base material film 3 coated with an adhesive is placed on the ribbon 1.

In this case, the base material used for sandwiching the ribbons between the films of the base materials in a flat state may include various organic materials such as polyethylene terephthalate, papers, etc. Also, a base material having a thickness of from 0.5 to 200 μm can be used and, depending on the intended application, a base material made up of two or more kinds of materials can also be used. In addition, in magnetic markers used for article surveillance, etc., the magnetic markers are generally adhered to the articles. In this case, a base material film having a pressure-sensitive adhesive layer on the back surface (not shown in the figure) may be used.

Figure 7:
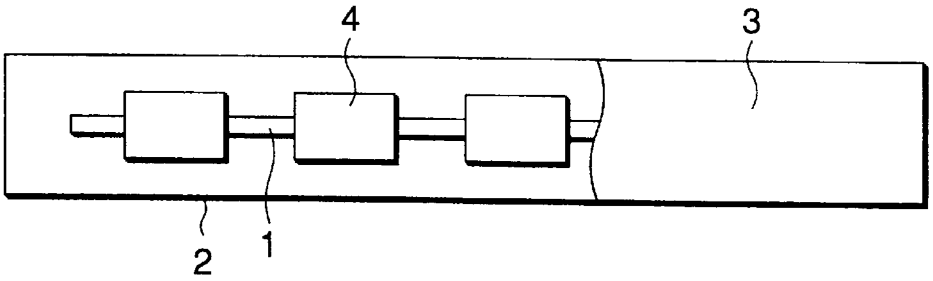
FIG. 7 is a schematic perspective view showing an example of the magnetic marker of the present invention capable of adopting a deactivation state.

Also, in order to allow the magnetic marker to have two kinds of states, that is, a state which exhibits no marker characteristics (hereinafter, referred to as a deactivation state) and a state exhibiting marker characteristics, a semi-hard magnetic material having a coercive force of exceeding 30 Oe may be used together with the amorphous alloy ribbon. For example, FIG. 7 is a schematic view of one embodiment of the magnetic marker of the present invention which can adopt a deactivation state. In FIG. 7, a semi-hard magnetic material 4 comprising a plurality of small pieces is disposed around the amorphous alloy ribbon 1. The amorphous alloy ribbon 1 and the hard magnetic materials 4 are sandwiched between base material film 2 and base material film 3. When a magnetic field exceeding 50 Oe is applied to such a magnetic marker, the semi-hard magnetic materials 4 are magnetized and the amorphous alloy ribbon 1 is exposed to a bias magnetic field. Thereafter, even if the magnetic marker is placed in an external alternating magnetic field, it maintains a deactivation state and does not generate high pulse voltage.

The Fe group-based amorphous alloy ribbon of the present invention can be produced using a melt spinning method to obtain the above-described specific cross-sectional dimensions, followed by heat treatment.

The melt spinning method is not particularly limited as long as amorphous alloy ribbons having the specific cross-sectional dimensions as defined by the present invention are obtained. The amorphous alloy ribbons are preferably produced by a melt extraction method, a centrifugal melt spinning method, a single roll melt spinning method, or a twin roll melt spinning method, which is conventionally known as a melt spinning method. For example, when a single roll melt spinning method is utilized as the melt spinning method, amorphous alloy ribbons can be produced by melting an alloy in a ceramic nozzle having an orifice at the tip thereof, and by ejecting the molten alloy onto the surface of a rotary copper roll to quench and solidify the molten alloy. Typical production conditions include the use of a ceramic nozzle having a nozzle orifice having a cross-sectional area of 0.2 $mm^2$ or smaller, and the molten alloy may be ejected from the nozzle orifice onto a copper roll rotating at a peripheral speed of from 5 to 50 meters/second at a pressure of 0.005 $kg/cm^2$ or higher in the air, under vacuum, or in an inert gas atmosphere such as argon gas, etc.

Also, as long as amorphous alloy ribbons having the cross-sectional dimensions defined by the present invention are obtained, it is possible to employ without difficulty a method in which (1) a broad width amorphous alloy ribbon is produced by a melt spinning method, and (2) an amorphous alloy ribbon having a narrow width is produced from the foregoing wide ribbon by a mechanical slitting method.

The heat-treatment method of the amorphous alloy ribbon of the present invention is not particularly limited as long as amorphous alloy ribbon exhibiting a large Barkhausen discontinuity in the magnetic hysteresis loop after heat treatment is obtained. The preferred methods for heat-treating the amorphous alloy ribbon of the present invention include a method of heat-treating in a temperature range of from 250° C. to the crystallization temperature of the alloy constituting the amorphous alloy ribbon for a time of from 0.1 to 100,000 seconds under conditions where twisting and tension are hardly applied to the ribbon; a method of heat-treating in a temperature range of from 250° C. to the crystallization temperature at a time of from 0.1 to 100,000 seconds while twisting from 0.05 to 3.5 turns per 10 cm length of the ribbon; and a method of heat-treating a temperature range of from 250° C. to the crystallization temperature at a time of from 0.1 to 100,000 seconds while twisting from 0.03 to 3.5 turns per 10 cm length of ribbon and while also applying a stress of from 0.05 to 130 $kg/mm^2$ in the lengthwise direction of the ribbon, etc.

Also, the amorphous alloy ribbon having good large Barkhausen discontinuity characteristics of the present invention can be produced by a method of heat-treating which comprises passing an electric current through the amorphous alloy ribbon having the specific cross-sectional dimensions defined in the present invention, or by a method of heat-treating which comprises applying a magnetic field and further passing an electric current during heat treatment through the above-described amorphous alloy ribbon, in addition to the other heat-treatment methods described above. In these methods, in order to realize large Barkhausen discontinuity characteristics having a low critical magnetic field, the heat treatment may comprise a method of passing a direct current or an alternating current of from 0.01 to 20 A through the lengthwise direction of the amorphous alloy ribbon in a temperature range of from 200° C. to the crystallization temperature, or a method of passing a direct current or an alternating current of from 0.01 to 20 A through the lengthwise direction of the amorphous alloy ribbon in an applied direct current or alternating magnetic field of from 0.05 to 20 Oe.

The present invention is further described with reference to the following Examples and Comparative Examples which are by way of illustration only but not by way of limitation.

EXAMPLES 1 TO 13 and

Comparative Examples 1 to 9

Each of the alloys composed of the various compositions shown in Table 1 below was quenched using a single roll melt spinning method to prepare a ribbon.

In addition, in the single roll melt spinning method, each of the alloys shown in Table 1 was melted in a quartz nozzle having a nozzle orifice of from 80 to 900 μm in diameter in an argon atmosphere. The molten alloy was ejected onto a copper roll having a diameter of 20 cm rotating at from 1000 to 4500 rpm at an argon gas ejecting pressure of from 0.5 to 4 kg/cm$^2$, and the molten alloy was quenched to prepare alloy ribbons. In this case, the distance between the quarts nozzle and the cooling roll surface was 1 mm or shorter.

The quenched ribbons thus prepared were heat-treated at 380° C. for 25 minutes while applying a twist of 0.5 turns per 10 cm length of the ribbons.

The structure, the width, the thickness, the pulse voltage, and the presence of a large Barkhausen discontinuity in the magnetic hysteresis loop of each ribbon were measured. The results are shown in Table 1 below.

With respect to the structure of the ribbon, a halo pattern obtained by an X-ray diffraction method, which is characteristic of an amorphous phase, was evaluated as having an amorphous state, and a ribbon comprising a mixture of an amorphous substance and a crystalline substance was evaluated as having a crystalline state. Also, 10 cross sections of each ribbon were observed by an optical microscope, OPTIPHOT (trade name, manufactured by NIKON CORPORATION) and the width and the thickness were calculated as average values of the 10 cross sections. Also, using the average values, the ratio (t/w) of the thickness (t) to the width (w) was calculated.

With respect to magnetic characteristics of the ribbons thus prepared, the magnetic hysteresis loop in an alternating magnetizing magnetic field of from 0.01 to 1 Oe and at a frequency of 60 Hz was measured. Furthermore, each ribbon having a length of 20 cm was held in at a flat state so as to determine the presence or absence of a large Barkhausen discontinuity and the minimum strength of the applied magnetic field needed to impart a large Barkhausen discontinuity (critical magnetic field).

Furthermore, with respect to the pulse voltage generating characteristics of each amorphous alloy ribbon thus prepared, the ribbon was magnetized with a sine wave having a frequency of 50 Hz and a maximum magnetic field of 1 Oe. The pulse voltage was measured using a detection coil of 590 turns having a length of 3.5 cm and an inside diameter of 3 cm coiled around the central portion of the amorphous alloy ribbon.

TABLE 1

| | Composition (atomic %) | Structure | Thickness (μm) | Width (μm) | Thickness/ Width Ratio | Existence of Large Barkausen Discontinuity | Critical Magnetic Field (Oe) | Detection Pulse Voltage (mV) |
|---|---|---|---|---|---|---|---|---|
| Ex. 1 | $Fe_{78}Si_9B_{13}$ | Amorphous | 35 | 652 | 0.054 | Observed | 0.38 | 85 |
| Ex. 2 | $Fe_{78}Si_9B_{13}$ | Amorphous | 16 | 800 | 0.020 | Observed | 0.33 | 79 |
| Ex. 3 | $Fe_{78}Si_9B_{13}$ | Amorphous | 43 | 295 | 0.146 | Observed | 0.39 | 78 |
| Ex. 4 | $Fe_{78}Si_9B_{13}$ | Amorphous | 15 | 728 | 0.021 | Observed | 0.37 | 73 |
| Ex. 5 | $Fe_{78}Si_9B_{13}$ | Amorphous | 44 | 150 | 0.293 | Observed | 0.33 | 71 |
| Ex. 6 | $Fe_{67}Co_{11}Si_9B_{13}$ | Amorphous | 25 | 610 | 0.041 | Observed | 0.34 | 82 |
| Ex. 7 | $Fe_{18}Co_{60}Si_9B_{13}$ | Amorphous | 28 | 615 | 0.046 | Observed | 0.35 | 76 |
| Ex. 8 | $Fe_{60}Ni_{18}Si_7B_{15}$ | Amorphous | 33 | 605 | 0.055 | Observed | 0.38 | 72 |
| Ex. 9 | $Fe_{50}Co_{10}Ni_{18}Si_7B_{15}$ | Amorphous | 32 | 618 | 0.052 | Observed | 0.32 | 73 |
| Ex. 10 | $Fe_{50}Co_5Ni_{23}Si_7B_{15}$ | Amorphous | 31 | 620 | 0.050 | Observed | 0.36 | 71 |
| Ex. 11 | $Co_{72}Si_{13.5}B_{14.5}$ | Amorphous | 33 | 605 | 0.055 | Observed | 0.38 | 72 |
| Ex. 12 | $Fe_{76}P_{13}C_7Cr_3Mo_1$ | Amorphous | 31 | 620 | 0.050 | Observed | 0.36 | 71 |
| Ex. 13 | $Fe_{83}Zr_7B_7Cu_1Nb_2$ | Amorphous | 33 | 605 | 0.055 | Observed | 0.38 | 72 |
| Com. Ex. 1 | $Fe_{78}Si_9B_{13}$ | Amorphous | 25 | 1050 | 0.024 | None | — | 56 |
| Com. Ex. 2 | $Fe_{81}Si_4B_{14}Cl$ | Amorphous | 25 | 2000 | 0.013 | None | — | 45 |
| Com. Ex. 3 | $Fe_{78}Si_9B_{13}$ | Amorphous | 35 | 98 | 0.357 | Observed | 0.32 | 36 |
| Com. Ex. 4 | $Fe_{78}Si_9B_{13}$ | Amorphous | 7 | 330 | 0.021 | Observed | 0.36 | 26 |
| Com. Ex. 5 | $Fe_{78}Si_2B_{20}$ | Crystalline | 65 | 239 | 0.27 | None | — | 12 |
| Com. Ex. 6 | $Fe_{78}Si_9B_{13}$ | Crystalline | 55 | 98 | 0.561 | None | — | 13 |
| Com. Ex. 7 | $Fe_{23}Co_{35}Cr_{20}Si_9B_{13}$ | Amorphous | 32 | 302 | 0.106 | None | — | —* |
| Com. Ex. 8 | $Fe_{53}Cr_{25}Si_9B_{13}$ | Amorphous | 22 | 262 | 0.084 | None | — | —* |
| Com. Ex. 9 | $Fe_{64}Si_{16}B_{20}$ | Crystalline | 18 | 289 | 0.062 | None | — | 12 |

*: not detected

As shown in Table 1 above, the Fe group-based amorphous ribbons of the present invention had a magnetic hysteresis loop exhibiting a large Barkhausen discontinuity, reflecting the specific cross-sectional dimensions of the present invention. Also, the critical magnetic field at the magnetic flux reversal was lower than 0.5 Oe in each sample. Additionally, the induced pulse generated in the detection coil had a sharp wave form. Thus, each sample of the invention provided excellent pulse voltage generating characteristics of 70 mV or higher and excellent detection characteristics.

On the other hand, those ribbons having a width exceeding 900 μm or having a cross section where the ratio of the width to the thickness was less than 0.015 as shown in Comparative Examples 1 and 2, respectively, did not exhibit a large Barkhausen discontinuity even though they were amorphous and even when these ribbons were twisted only once per 10 cm length during the heat treatment. In these comparative samples, the pulse voltages thus generated were extremely low as compared with Examples 1 to 13 of the present invention.

Also, in the case of ribbons having a width of less than 100 μm or a thickness of less than 8 μm as shown in Comparative Examples 3 and 4, respectively, the resulting pulse voltages were low. Thus, these ribbons were not practically useful as magnetic markers and the like even though they were amorphous and exhibited a large Barkhausen discontinuity.

In those ribbons having a thickness exceeding 50 μm or having cross-sectional dimensions such that the ratio of the width to the thickness exceeded 0.4 as shown in Comparative Examples 5 and 6, respectively, the quenching effect during production was insufficient and an amorphous structure was not obtained. Furthermore, these ribbons did not exhibit magnetic characteristics having a large Barkhausen discontinuity.

Furthermore, in the ribbons of Comparative Examples 7 and 8, the total content of Fe group elements in each sample was less than 65 atomic %. Although these samples had an amorphous structure, they were non-magnetic ribbons and a pulse voltage was not detected.

Also, in the ribbon of Comparative Example 9, the content of elements which accelerate the formation of an amorphous phase was too large and therefore an amorphous structure was not formed. The ribbon did not exhibit a large Barkhausen discontinuity, and the pulse voltage thus generated was very low.

EXAMPLES 14 TO 26

The same procedure was followed as in Example 1, except that the length of each of the ribbons of Examples 1 to 13 was changed to 10 cm. The magnetic characteristics were evaluated as a function of the cross-sectional dimensions of the ribbons thus prepared. The results are shown in Table 2 below.

TABLE 2

| | Composition (atomic %) | Structure | Thickness (μm) | Width (μm) | Thickness/Width Ratio | Existence of Large Barkausen Discontinuity | Critical Magnetic Field (Oe) | Detection Pulse Voltage (mV) |
|---|---|---|---|---|---|---|---|---|
| Example 14 | $Fe_{78}Si_9B_{13}$ | Amorphous | 35 | 652 | 0.054 | Observed | 0.36 | 84 |
| Example 15 | $Fe_{78}Si_9B_{13}$ | Amorphous | 16 | 800 | 0.020 | Observed | 0.32 | 77 |
| Example 16 | $Fe_{78}Si_9B_{13}$ | Amorphous | 43 | 295 | 0.146 | Observed | 0.37 | 77 |
| Example 17 | $Fe_{78}Si_9B_{13}$ | Amorphous | 15 | 728 | 0.021 | Observed | 0.35 | 72 |
| Example 18 | $Fe_{78}Si_9B_{13}$ | Amorphous | 44 | 150 | 0.293 | Observed | 0.32 | 70 |
| Example 19 | $Fe_{67}Co_{11}Si_9B_{13}$ | Amorphous | 25 | 610 | 0.041 | Observed | 0.32 | 80 |
| Example 20 | $Fe_{18}Co_{60}Si_9B_{13}$ | Amorphous | 28 | 615 | 0.046 | Observed | 0.33 | 75 |
| Example 21 | $Fe_{60}Ni_{18}Si_7B_{15}$ | Amorphous | 33 | 605 | 0.055 | Observed | 0.35 | 72 |
| Example 22 | $Fe_{50}Co_{10}Ni_{18}Si_7B_{15}$ | Amorphous | 32 | 618 | 0.052 | Observed | 0.31 | 71 |
| Example 23 | $Fe_{50}Co_5Ni_{23}Si_7B_{15}$ | Amorphous | 31 | 620 | 0.050 | Observed | 0.35 | 71 |
| Example 24 | $Co_{72}Si_{13.5}B_{14.5}$ | Amorphous | 33 | 605 | 0.055 | Observed | 0.37 | 73 |
| Example 25 | $Fe_{76}P_{13}C_7Cr_3Mo_1$ | Amorphous | 31 | 620 | 0.050 | Observed | 0.35 | 72 |
| Example 26 | $Fe_{83}Zr_7B_7Cu_1Nb_2$ | Amorphous | 33 | 605 | 0.055 | Observed | 0.35 | 71 |

As shown in Table 2 above, the Fe group-based amorphous ribbons of the present invention still exhibited a large Barkhausen discontinuity even though the length thereof was shortened to 10 cm, reflecting the specific cross-sectional dimensions of the present invention. Also, the critical magnetic field at the magnetic flux reversal of each sample was almost the same as obtained for the corresponding ribbon having a length of 20 cm. Additionally, the magnitude of the magnetic field needed to impart large Barkhausen discontinuity was less than 0.5 Oe in each case. Additionally, the induced pulse generated in the detection coil for each sample had a sharp wave form, and each sample provided excellent pulse voltage generating characteristics and excellent detection characteristics.

EXAMPLES 27 TO 39 and

Comparative Examples 10 to 13

Each of the alloys having the compositions shown in Table 3 below was quenched using the single roll melt spinning method as in Example 1 and heat-treated.

The structure, width, thickness, cross-sectional area, the presence or absence of a large Barkhausen discontinuity in the magnetic hysteresis loop, and the value of the critical magnetic field of each ribbon were evaluated as in Example 1.

The results obtained are shown in Table 3 below.

TABLE 3

| | Composition (atomic %) | Structure | Thickness (μm) | Width (μm) | Cross-Sectional Area (mm$^2$) | Existence of Large Barkhausen Discontinuity | Critical Magnetic Field (Oe) | Detection Pulse Voltage (mV) |
|---|---|---|---|---|---|---|---|---|
| Ex. 27 | $Fe_{78}Si_9B_{13}$ | Amorphous | 37 | 280 | 0.0088 | Observed | 0.38 | 85 |
| Ex. 28 | $Fe_{78}Si_9B_{13}$ | Amorphous | 41 | 260 | 0.0095 | Observed | 0.33 | 79 |
| Ex. 29 | $Fe_{78}Si_9B_{13}$ | Amorphous | 45 | 786 | 0.0300 | Observed | 0.39 | 78 |
| Ex. 30 | $Fe_{78}Si_9B_{13}$ | Amorphous | 15 | 700 | 0.0089 | Observed | 0.37 | 73 |
| Ex. 31 | $Fe_{78}Si_9B_{13}$ | Amorphous | 45 | 150 | 0.0057 | Observed | 0.33 | 71 |
| Ex. 32 | $Fe_{39}Co_{39}Si_9B_{13}$ | Amorphous | 32 | 296 | 0.0081 | Observed | 0.34 | 82 |
| Ex. 33 | $Fe_{16}Co_{62}Si_9B_{13}$ | Amorphous | 28 | 310 | 0.0074 | Observed | 0.35 | 76 |
| Ex. 34 | $Fe_{60}Ni_{18}Si_9B_{13}$ | Amorphous | 33 | 345 | 0.0097 | Observed | 0.38 | 72 |
| Ex. 35 | $Fe_{30}Co_{30}Ni_{18}Si_9B_{13}$ | Amorphous | 35 | 288 | 0.0096 | Observed | 0.32 | 73 |
| Ex. 36 | $Fe_{30}Co_{18}Ni_{30}Si_7B_{15}$ | Amorphous | 45 | 460 | 0.0197 | Observed | 0.36 | 71 |
| Ex. 37 | $Co_{72.5}Si_{12.5}B_{15}$ | Amorphous | 36 | 285 | 0.0097 | Observed | 0.31 | 72 |
| Ex. 38 | $Fe_{78}P_{13}C_7Cr_2$ | Amorphous | 31 | 315 | 0.0093 | Observed | 0.34 | 85 |
| Ex. 39 | $Fe_{83}Zr_7B_6Cu_1Nb_3$ | Amorphous | 26 | 327 | 0.0072 | Observed | 0.35 | 74 |
| Com. Ex. 10 | $Fe_{78}Si_9B_{13}$ | Amorphous | 25 | 1050 | 0.0223 | None | — | 56 |
| Com. Ex. 11 | $Fe_{78}Si_9B_{13}$ | Amorphous | 18 | 2000 | 0.0425 | None | — | 45 |
| Com. Ex. 12 | $Fe_{78}Si_9B_{13}$ | Amorphous | 35 | 98 | 0.0029 | Observed | 0 31 | 36 |
| Com. Ex. 13 | $Fe_{78}Si_9B_{13}$ | Amorphous | 7 | 330 | 0.0021 | Observed | 0.34 | 26 |

As shown in Table 3 above, each of the Fe group-based amorphous ribbon of the present invention in Examples 27 to 39 had a magnetic hysteresis loop exhibiting a large Barkhausen discontinuity, reflecting the specific cross-sectional dimensions of the present invention. Furthermore, the critical magnetic field needed to impart a large Barkhausen discontinuity was lower than 0.5 Oe in each case. Also, the induced pulse generated in each detection coil was a pulse having a sharp wave form, and each sample had excellent pulse voltage generating characteristics of 70 mV or higher.

EXAMPLES 40 TO 52

The same procedure as in Example 27 was followed, except that the length of each of the ribbons of Examples 27 to 39 was shortened to 10 cm. The magnetic characteristics were evaluated as a function of the cross-sectional dimensions of the ribbons thus prepared.

The results are shown in Table 4 below.

TABLE 4

| | Composition (atomic %) | Structure | Thickness (μm) | Width (μm) | Cross-Sectional Area (mm$^2$) | Existence of Large Barkhausen Discontinuity | Critical Magnetic Field (Oe) | Detection Pulse Voltage (mV) |
|---|---|---|---|---|---|---|---|---|
| Ex. 40 | $Fe_{78}Si_9B_{13}$ | Amorphous | 37 | 280 | 0.0088 | Observed | 0.36 | 82 |
| Ex. 41 | $Fe_{78}Si_9B_{13}$ | Amorphous | 41 | 260 | 0.0095 | Observed | 0.31 | 76 |
| Ex. 42 | $Fe_{78}Si_9B_{13}$ | Amorphous | 45 | 786 | 0.0300 | Observed | 0.36 | 77 |
| Ex. 43 | $Fe_{78}Si_9B_{13}$ | Amorphous | 15 | 700 | 0.0089 | Observed | 0.35 | 73 |
| Ex. 44 | $Fe_{78}Si_9B_{13}$ | Amorphous | 45 | 150 | 0.0057 | Observed | 0.32 | 72 |
| Ex. 45 | $Fe_{39}Co_{39}Si_9B_{13}$ | Amorphous | 32 | 296 | 0.0081 | Observed | 0.32 | 80 |
| Ex. 46 | $Fe_{16}Co_{62}Si_9B_{13}$ | Amorphous | 28 | 310 | 0.0074 | Observed | 0.34 | 75 |
| Ex. 47 | $Fe_{60}Ni_{18}Si_9B_{13}$ | Amorphous | 33 | 345 | 0.0097 | Observed | 0.37 | 72 |
| Ex. 48 | $Fe_{30}Co_{30}Ni_{18}Si_9B_{13}$ | Amorphous | 35 | 288 | 0.0096 | Observed | 0.31 | 73 |
| Ex. 49 | $Fe_{30}Co_{18}Ni_{30}Si_7B_{15}$ | Amorphous | 45 | 460 | 0.0197 | Observed | 0.35 | 71 |
| Ex. 50 | $Co_{72.5}Si_{12.5}B_{15}$ | Amorphous | 36 | 285 | 0.0097 | Observed | 0.31 | 73 |
| Ex. 51 | $Fe_{78}P_{13}C_7Cr_2$ | Amorphous | 31 | 315 | 0.0093 | Observed | 0.33 | 84 |
| Ex. 52 | $Fe_{83}Zr_7B_6Cu_1Nb_3$ | Amorphous | 26 | 327 | 0.0072 | Observed | 0.34 | 73 |

On the other hand, in those ribbons having a width exceeding 900 μm or having a cross sectional area exceeding 0.03 mm$^2$ as shown in Comparative Examples 10 and 11, respectively, a magnetic hysteresis loop exhibiting a large Barkhausen discontinuity was not obtained, and the pulse voltage thus generated was extremely low as compared with Examples 27 to 39.

Also, in those ribbons having a width of less than 100 μm or a thickness of less than 8 μm, or having a cross-sectional area of less than 0.003 mm$^2$ as in Comparative Examples 12 and 13, the resulting pulse voltages were low. Thus, these ribbons were not practically useful as magnetic markers and the like, even though they had an amorphous structure and exhibited a large Barkhausen discontinuity.

As shown in Table 4 above, the Fe group-based amorphous ribbons of the present invention exhibited a large Barkhausen discontinuity even when the length was shortened to 10 cm, reflecting the specific cross-sectional dimensions of the present invention. Furthermore, the critical magnetic field at the magnetic flux reversal of each sample was almost the same as obtained for the corresponding ribbon having a length of 20 cm. Additionally, the magnitude of the magnetic field (critical magnetic field) needed to impart a large Barkhausen discontinuity was less than 0.5 Oe in each case. Thus, the induced pulse generated in the detection coil for each sample had a sharp wave form, and each sample provided excellent pulse voltage generating characteristics of 70 mV or higher and excellent detection characteristics.

EXAMPLES 53 TO 57

Each of the alloys having the compositions shown in Table 5 below was quenched using the single roll melt spinning method as in Example 1 and heat treated.

The structure, width, thickness, cross-sectional area, the presence or absence of a large Barkhausen discontinuity in the magnetic hysteresis loop, and the value of the critical magnetic field of each ribbon having a length of 7 cm were evaluated as in Example 1.

The results obtained are shown in Table 5 below.

TABLE 5

| | Composition (atomic %) | Structure | Thickness (μm) | Width (μm) | Thickness/ Width Ratio | Cross-Sectional Area ($mm^2$) | Existence of Large Barkhausen Discontinuity | Critical Magnetic Field (Oe) | Detection Detection Voltage (mV) |
|---|---|---|---|---|---|---|---|---|---|
| Ex. 53 | $Fe_{78}Si_7B_{13}$ | Amorphous | 35 | 690 | 0.051 | 0.020 | Observed | 0.31 | 85 |
| Ex. 54 | $Fe_{78}Si_7B_{13}$ | Amorphous | 45 | 280 | 0.161 | 0.011 | Observed | 0.36 | 78 |
| Ex. 55 | $Fe_{78}Si_7B_{13}$ | Amorphous | 45 | 150 | 0.300 | 0.006 | Observed | 0.39 | 71 |
| Ex. 56 | $Fe_{68}Co_{10}Si_7B_{15}$ | Amorphous | 33 | 605 | 0.055 | 0.017 | Observed | 0.32 | 72 |
| Ex. 57 | $Fe_{38}Co_{38}Ni_2Si_7B_{13}$ | Amorphous | 32 | 618 | 0.052 | 0.018 | Observed | 0.30 | 73 |

As shown in Table 5 above, the Fe group-based amorphous ribbons of the present invention exhibited a large Barkhausen discontinuity even when the length was shortened to 7 cm, reflecting the specific cross-sectional dimensions of the present invention. The critical magnetic field at the magnetic flux reversal was lower than 0.5 (Oe) in each case. Thus, the induced pulse generated in each detection coil was a sharp wave form, and each sample had excellent pulse voltage generating characteristics of 70 mV or higher and excellent detection characteristics.

EXAMPLES 58 TO 83

Each of the ribbons prepared in Examples 1 to 13 and Examples 27 to 39 was cut to a length of 8.5 cm to provide a pulse generating magnetic substance for forming magnetic markers. Then, each sample was inserted between polyethylene terephthalate films as base material films having a thickness of 25 μm and a width of 5 mm and each coated with an adhesive, to provide magnetic markers having the structure shown in FIG. 6 and a length of 9 cm. In the magnetic markers thus prepared, each ribbon was held flat so that the twist applied during heat treatment was released.

The alternating magnetic hysteresis loop in a magnetizing magnetic field of from 0.01 to 1 Oe and at a frequency of 60 Hz was measured with respect to each of the magnetic markers thus prepared to determine the presence or absence of a large Barkhausen discontinuity. Furthermore, with respect to pulse voltage generating characteristics, each of the magnetic markers thus prepared was magnetized by a sine wave having a frequency of 50 Hz and an applied maximum magnetic field of 1 Oe. The pulse voltage was measured using a detection coil of 590 turns having a length of 3.5 cm and an inside diameter of 3 cm coiled around the magnetic marker.

The results are shown in Tables 6 and 7.

TABLE 6

| | Composition (atomic %) | Structure | Thickness (μm) | Width (μm) | Thickness/ Width Ratio | Existence of Large Barkausen Discontinuity | Critical Magnetic Field (Oe) | Detection Pulse Voltage (mV) |
|---|---|---|---|---|---|---|---|---|
| Example 58 | $Fe_{78}Si_9B_{13}$ | Amorphous | 35 | 652 | 0.054 | Observed | 0.35 | 80 |
| Example 59 | $Fe_{78}Si_9B_{13}$ | Amorphous | 16 | 800 | 0.020 | Observed | 0.30 | 75 |
| Example 60 | $Fe_{78}Si_9B_{13}$ | Amorphous | 43 | 295 | 0.146 | Observed | 0.34 | 74 |
| Example 61 | $Fe_{78}Si_9B_{13}$ | Amorphous | 15 | 728 | 0.021 | Observed | 0.34 | 73 |
| Example 62 | $Fe_{78}Si_9B_{13}$ | Amorphous | 44 | 150 | 0.293 | Observed | 0.31 | 71 |
| Example 63 | $Fe_{67}Co_{11}Si_9B_{13}$ | Amorphous | 25 | 610 | 0.041 | Observed | 0.30 | 78 |
| Example 64 | $Fe_{18}Co_{60}Si_9B_{13}$ | Amorphous | 28 | 615 | 0.046 | Observed | 0.31 | 74 |
| Example 65 | $Fe_{60}Ni_{18}Si_7B_{15}$ | Amorphous | 33 | 605 | 0.055 | Observed | 0.34 | 71 |
| Example 66 | $Fe_{50}Co_{10}Ni_{18}Si_7B_{15}$ | Amorphous | 32 | 618 | 0.052 | Observed | 0.28 | 71 |
| Example 67 | $Fe_{50}Co_5Ni_{23}Si_7B_{15}$ | Amorphous | 31 | 620 | 0.050 | Observed | 0.31 | 72 |
| Example 68 | $Co_{72}Si_{13.5}B_{14.5}$ | Amorphous | 33 | 605 | 0.055 | Observed | 0.33 | 74 |
| Example 69 | $Fe_{76}P_{13}C_7Cr_3Mo_1$ | Amorphous | 31 | 620 | 0.050 | Observed | 0.34 | 71 |
| Example 70 | $Fe_{83}Zr_7B_7Cu_1Nb_2$ | Amorphous | 33 | 605 | 0.055 | Observed | 0.32 | 71 |

TABLE 7

| | Composition (atomic %) | Structure | Thickness (μm) | Width (μm) | Cross-Sectional Area (mm$^2$) | Existence of Large Barkhausen Discontinuity | Critical Magnetic Field (Oe) | Detection Pulse Voltage (mV) |
|---|---|---|---|---|---|---|---|---|
| Ex. 71 | $Fe_{78}Si_9B_{13}$ | Amorphous | 37 | 280 | 0.0088 | Observed | 0.34 | 81 |
| Ex. 72 | $Fe_{78}Si_9B_{13}$ | Amorphous | 41 | 260 | 0.0095 | Observed | 0.30 | 75 |
| Ex. 73 | $Fe_{78}Si_9B_{13}$ | Amorphous | 45 | 786 | 0.0300 | Observed | 0.32 | 76 |
| Ex. 74 | $Fe_{78}Si_9B_{13}$ | Amorphous | 15 | 700 | 0.0089 | Observed | 0.31 | 72 |
| Ex. 75 | $Fe_{78}Si_9B_{13}$ | Amorphous | 45 | 150 | 0.0057 | Observed | 0.30 | 72 |
| Ex. 76 | $Fe_{39}Co_{39}Si_9B_{13}$ | Amorphous | 32 | 296 | 0.0081 | Observed | 0.29 | 78 |
| Ex. 77 | $Fe_{16}Co_{62}Si_9B_{13}$ | Amorphous | 28 | 310 | 0.0074 | Observed | 0.33 | 74 |
| Ex. 78 | $Fe_{60}Ni_{18}Si_9B_{13}$ | Amorphous | 33 | 345 | 0.0097 | Observed | 0.35 | 73 |
| Ex. 79 | $Fe_{30}Co_{30}Ni_{18}Si_9B_{13}$ | Amorphous | 35 | 288 | 0.0096 | Observed | 0.31 | 74 |
| Ex. 80 | $Fe_{30}Co_{18}Ni_{30}Si_7B_{15}$ | Amorphous | 45 | 460 | 0.0197 | Observed | 0.34 | 71 |
| Ex. 81 | $Co_{72.5}Si_{12.5}B_{15}$ | Amorphous | 36 | 285 | 0.0097 | Observed | 0.30 | 72 |
| Ex. 82 | $Fe_{78}P_{13}C_7Cr_2$ | Amorphous | 31 | 315 | 0.0093 | Observed | 0.33 | 80 |
| Ex. 82 | $Fe_{83}Zr_7B_6Cu_1Nb_3$ | Amorphous | 26 | 327 | 0.0072 | Observed | 0.33 | 71 |

As shown in Tables 6 and 7, in each of the magnetic markers of Examples 58 to 83, a magnetic hysteresis loop exhibiting a large Barkhausen discontinuity was obtained for a marker length of 9 cm, reflecting the use of a ribbon having the specific cross-sectional dimensions of the present invention. Thus, the induced pulse generated in the detection coil had a sharp wave form, and each sample had excellent pulse voltage generating characteristics of 70 mV or higher. Also, the strength of the magnetic field (critical magnetic field) needed to evoke a large Barkhausen discontinuity in each of the magnetic markers was lower than 0.5 Oe as shown from Tables 6 and 7.

EXAMPLES 84 TO 93 and

Comparative Examples 14 to 16

Each of the alloys having the compositions shown in Table 8 was quenched using the single roll melt spinning method of Example 1 to prepare ribbons. Also, each ribbon was heat-treated at 390° C. for 10 minutes while applying a twist of from 0.025 to 30 turns per 10 cm length of the ribbon.

Then, for each of the ribbons thus prepared, the structure, width, thickness, cross-sectional area, pulse voltage, the presence or absence of a large Barkhausen discontinuity in the magnetic hysteresis loop, and the critical magnetic field were measured using ribbons each having a length of 10 cm as in Example 1.

The results obtained are shown in Table 8 below.

TABLE 8

| | Composition (atomic %) | Structure | Thickness (μm) | Width (μm) | Thickness/ Width Ratio | Cross-Sectional Area (mm$^2$) | Twisting No. (turns/10 cm) | Existence of Large Barkhausen Discontinuity | Detection Pulse Voltage (mV) |
|---|---|---|---|---|---|---|---|---|---|
| Ex. 84 | $Fe_{78}Si_7B_{15}$ | Amorphous | 37 | 650 | 0.057 | 0.0187 | 1 | Observed | 85 |
| Ex. 85 | $Fe_{78}Si_7B_{15}$ | Amorphous | 18 | 800 | 0.023 | 0.0121 | 1.2 | Observed | 79 |
| Ex. 86 | $Fe_{78}Si_7B_{15}$ | Amorphous | 12 | 500 | 0.024 | 0.0051 | 0.5 | Observed | 78 |
| Ex. 87 | $Fe_{78}Si_7B_{15}$ | Amorphous | 15 | 700 | 0.021 | 0.0083 | 1.5 | Observed | 73 |
| Ex. 88 | $Fe_{78}Si_7B_{15}$ | Amorphous | 45 | 150 | 0.300 | 0.0052 | 0.1 | Observed | 71 |
| Ex. 89 | $Fe_{68}Co_{10}Si_7B_{15}$ | Amorphous | 25 | 610 | 0.041 | 0.0118 | 1 | Observed | 82 |
| Ex. 90 | $Fe_{18}Co_{60}Si_7B_{15}$ | Amorphous | 35 | 848 | 0.041 | 0.0239 | 3 | Observed | 76 |
| Ex. 91 | $Fe_{68}Ni_{10}Si_7B_{15}$ | Amorphous | 33 | 604 | 0.055 | 0.0160 | 1 | Observed | 72 |
| Ex. 92 | $Fe_{35}Co_{35}Ni_8Si_7B_{15}$ | Amorphous | 32 | 620 | 0.052 | 0.0159 | 1 | Observed | 73 |
| Ex. 93 | $Fe_{78}P_{13}C_7Mo_2$ | Amorphous | 32 | 615 | 0.052 | 0.0141 | 1 | Observed | 85 |
| Com. Ex. 14 | $Fe_{78}Si_7B_{15}$ | Amorphous | 25 | 1750 | 0.014 | 0.0351 | 0.5 | None | 56 |
| Com. Ex. 15 | $Fe_{78}Si_7B_{15}$ | Amorphous | 25 | 1750 | 0.014 | 0.0351 | 3 | None | 45 |
| Com. Ex. 16 | $Fe_{78}Si_7B_{15}$ | Amorphous | 25 | 1750 | 0.014 | 0.0351 | 1 | None | 36 |

As shown in Table 8 above, in each of the Fe group-based amorphous ribbons of Examples 84 to 93 of the present invention, a magnetic hysteresis loop exhibiting a large Barkhausen discontinuity was obtained for a twisting number of from 0.1 to 3 turns/10 cm during heat treatment, reflecting the specific cross-sectional dimensions of the ribbon defined in the present invention. Thus, the induced pulse generated in the detection coil had a sharp wave form and each ribbon had excellent pulse voltage generating characteristics of at least 70 mV. Also, the magnetic field (critical magnetic field) needed to evoke a large Barkhausen discontinuity of the Fe group-based amorphous ribbons of Examples 84 to 93 was from 0.2 to 0.5 Oe.

On the other hand, as shown in Comparative Examples 14 to 16, those ribbons having a cross section such that the ratio of the width to the thickness was less than 0.015 or having a cross-sectional area of 0.035 mm$^2$ or larger did not exhibit a large Barkhausen discontinuity even when the twisting number was from 0.5 to 3 turns/10 cm. Also, the pulse voltages thus generated were extremely low as compared with those of Examples 84 to 93.

As described above, the Fe group-based amorphous alloy ribbon of the present invention having specific cross-sectional dimensions can be prepared by twisting during heat treatment. The ribbon thus produced exhibits a large Barkhausen discontinuity in a critical magnetic field of 0.7 Oe or lower when held flat. Also, the amorphous ribbon has excellent characteristics as a pulse generating element for magnetic markers.

EXAMPLES 94 TO 96

Each of the alloys having the compositions shown in Table 9 was quenched using the single roll melt spinning method of Example 1 to prepare ribbons. Also, each ribbon was heat-treated at 340° C. for 10 minutes without applying a twist.

Then, for each of the ribbons thus prepared, the structure, width, thickness, cross-sectional area, pulse voltage, the presence or absence of a large Barkhausen discontinuity in the magnetic hysteresis loop, and the critical magnetic field were measured using ribbons each having a length of 10 cm as in Example 1.

The results obtained are shown in Table 9 below.

TABLE 9

| | Composition (atomic %) | Structure | Thickness (μm) | Width (μm) | Thickness/ Width Ratio | Cross-Sectional Area ($mm^2$) | Existence of Large Barkhausen Discontinuity | Critical Magnetic Field (Oe) | Detection Pulse Voltage (mV) |
|---|---|---|---|---|---|---|---|---|---|
| Ex. 94 | $Fe_{78}Si_8B_{14}$ | Amorphous | 35 | 305 | 0.115 | 0.010 | Observed | 0.16 | 71 |
| Ex. 95 | $Fe_{39}Co_{39}Si_8B_{14}$ | Amorphous | 45 | 280 | 0.161 | 0.012 | Observed | 0.15 | 72 |
| Ex. 96 | $Fe_{70}Co_8Si_8B_{14}$ | Amorphous | 35 | 250 | 0.140 | 0.007 | Observed | 0.12 | 71 |

As shown in Table 9 above, in each of the Fe group-based amorphous ribbons of Examples 94 to 96 of the present invention, a magnetic hysteresis loop exhibiting a large Barkhausen discontinuity was obtained even without twisting during heat treatment, reflecting the specific cross-sectional dimensions of the ribbon defined in the present invention. Thus, the induced pulse generated in the detection coil had a sharp wave form and each ribbon had excellent pulse voltage generating characteristics of at least 70 mV. Also, the magnetic field (critical magnetic field) needed to evoke a large Barkhausen discontinuity of the Fe group-based amorphous ribbons of Examples 94 to 96 was from 0.2 Oe or lower.

In addition, it was confirmed that the ribbons of Examples 94 to 96 exhibits a large Barkhausen discontinuity in a critical magnetic field of 0.2 Oe or lower even when the length was shortened to 7 cm.

As is clear from the results of Table 9, the Fe group-based amorphous alloy ribbon of the present invention which has no twisting after heat treatment exhibits a large Barkhausen discontinuity in a critical magnetic field of 0.7 Oe or lower, since it is obtained by heat-treating the ribbon having a specific cross-sectional dimensions under specific conditions. Thus, the amorphous ribbon has excellent characteristics as a pulse generator for magnetic markers.

While the invention has been described in detail and with reference to specific examples thereof, it will be apparent to one skilled in the art that various changes and modifications can be made therein without departing from the spirit and scope thereof.

What is claimed is:

1. An Fe group-based amorphous alloy ribbon having a cross section having a width of from 100 to 900 μm and a thickness of from 8 to 50 μm, and having a magnetic hysteresis loop which exhibits a large Barkhausen discontinuity when subjected to a magnetic field having a strength of from 0.05 to 0.5 Oe, wherein said alloy contains at least 65 atomic % of at least one of Fe, Co, and Ni and forms an amorphous single phase.

2. An Fe group-based amorphous alloy ribbon having a cross-sectional area of from 0.0025 to 0.03 $mm^2$, a thickness/width ratio of from about 0.0 15 to 0.4, and a magnetic hysteresis loop which exhibits a large Barkhausen discontinuity when subjected to a magnetic field having a strength of from 0.05 to 0.5 Oe, wherein said alloy contains at least 65 atomic % of at least one of Fe, Co, and Ni and forms an amorphous single phase.

3. An Fe group-based amorphous alloy ribbon having a cross section having a width of from 100 to 900 μm and a thickness of from 8 to 50 μm, wherein said ribbon is prepared by heat-treating a twisted ribbon, having a twisting number, when no stress is applied thereto, of from 0.05 to 3.5 turns per 10 cm length of the ribbon, and wherein said amorphous alloy ribbon when held flat has a magnetic hysteresis loop which exhibits a large Barkhausen discontinuity when subjected to a magnetic field having a strength of from 0.05 to 0.5 Oe, and said alloy contains at least 65 atomic % of at least one of Fe, Co, and Ni and forms an amorphous single phase.

4. An Fe group-based amorphous alloy ribbon having a cross-sectional area of from 0.0025 to 0.03 $mm^2$, wherein said ribbon is prepared by heat-treating a twisted ribbon, having a twisting number, when no stress is applied thereto, of from 0.05 to 3.5 turns per 10 cm length of the ribbon, and wherein said amorphous alloy ribbon when held flat has a magnetic hysteresis loop which exhibits a large Barkhausen discontinuity when subjected to a magnetic field having a strength of from 0.05 to 0.5 Oe, and said alloy contains at least 65 atomic % of at least one of Fe, Co, and Ni and forms an amorphous single phase.

5. The Fe group-based amorphous alloy ribbon as claimed in claim 1, wherein said large Barkhausen discontinuity comprises a magnetization change in an amount of at least 30% of the saturated magnetic flux density of said amorphous alloy ribbon.

6. The Fe group-based amorphous alloy ribbon as claimed in claim 1, having a width of from 150 to 800 μm and a thickness of from 15 to 45 μm.

7. The Fe group-based amorphous alloy ribbon as claimed in claim 1, having a thickness/width ratio of from 0.015 to 0.4.

8. The Fe group-based amorphous alloy ribbon as claimed in claim 1, having a length of 10 cm or shorter.

9. The Fe group-based amorphous alloy ribbon as claimed in claim 1, having a length of 7 cm or shorter.

10. The Fe group-based amorphous alloy ribbon as claimed in claim 2, having a cross-sectional area of from 0.003 to 0.0275 $mm^2$.

11. A magnetic marker comprising an Fe group-based amorphous alloy ribbon sandwiched between first and second base support materials, said amorphous alloy ribbon having a cross section having a width of from 100 to 900 $\mu$m and a thickness of from 8 to 50 $\mu$m and a magnetic hysteresis loop which exhibits a large Barkhausen discontinuity when subjected to a magnetic field having a strength of 0.7 Oe or lower, wherein said ribbon has a length of 10 cm or shorter, and said alloy contains at least 65 atomic % of at least one of Fe, Co, and Ni and forms an amorphous single phase.

12. The magnetic marker as claimed in claim 11, further comprising a semi-hard magnetic material having a coercive force exceeding 30 Oe which is disposed on at least a portion of said amorphous alloy ribbon.

13. A magnetic marker comprising an Fe group-based amorphous alloy ribbon sandwiched between first and second base support materials, said amorphous alloy ribbon having a cross-sectional area of from 0.0025 to 0.03 $mm^2$, a thickness/width ratio of from about 0.015 to 0.4, and a magnetic hysteresis loop which exhibits a large Barkhausen discontinuity when subjected to a magnetic field having a strength of 0.7 Oe or lower, where said alloy contains at least 65 atomic % of at least one of Fe, Co, and Ni and forms an amorphous single phase.

14. The magnetic marker as claimed in claim 13, further comprising a semi-hard magnetic material having a coercive force exceeding 30 Oe which is disposed on at least a portion of said amorphous alloy ribbon.

* * * * *